INVENTOR.
Glenn P. Gessell
BY
Barthel & Bugbee Attys

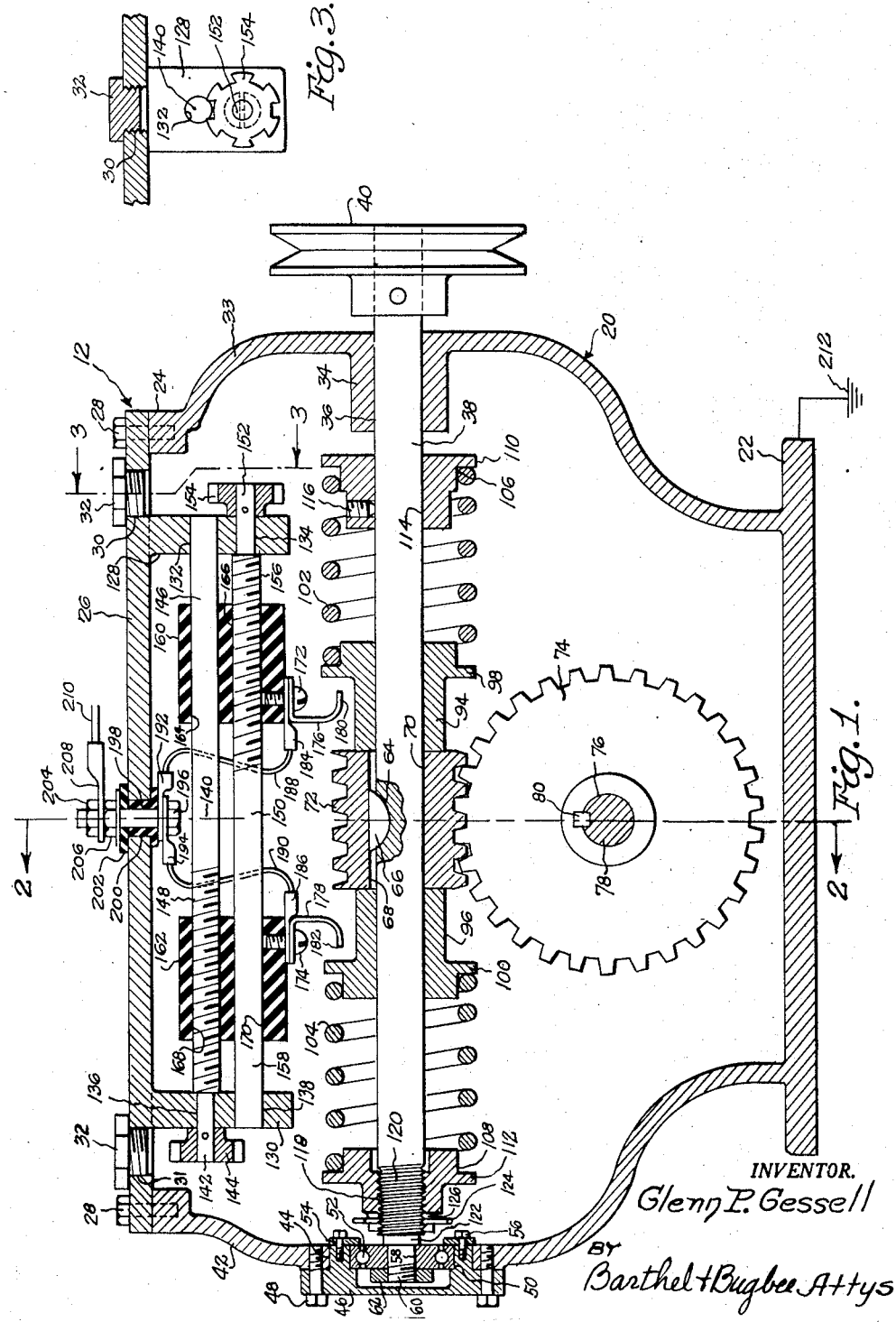

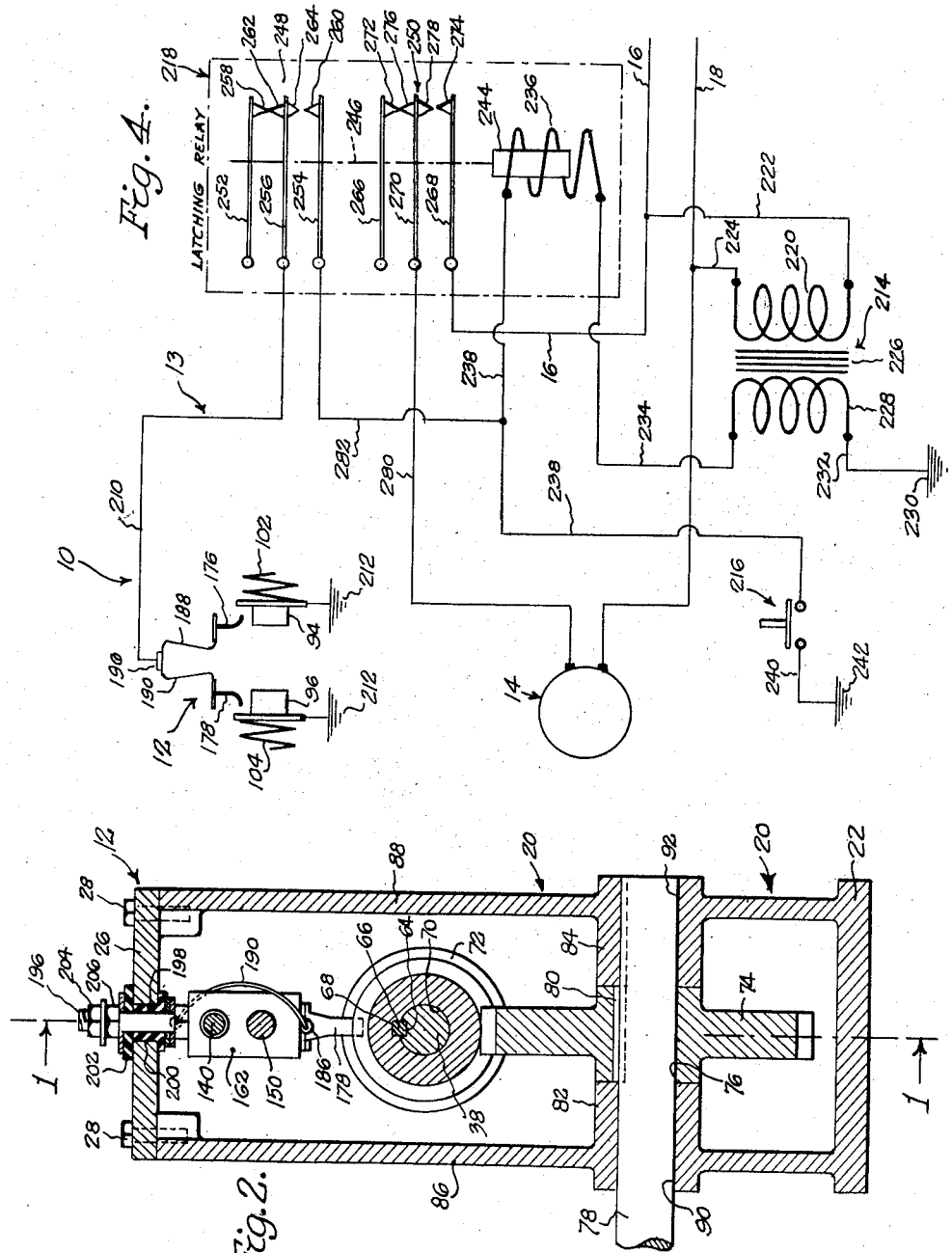

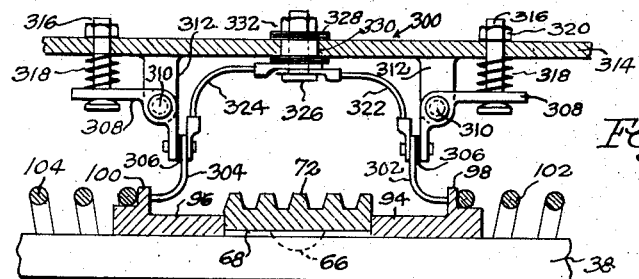
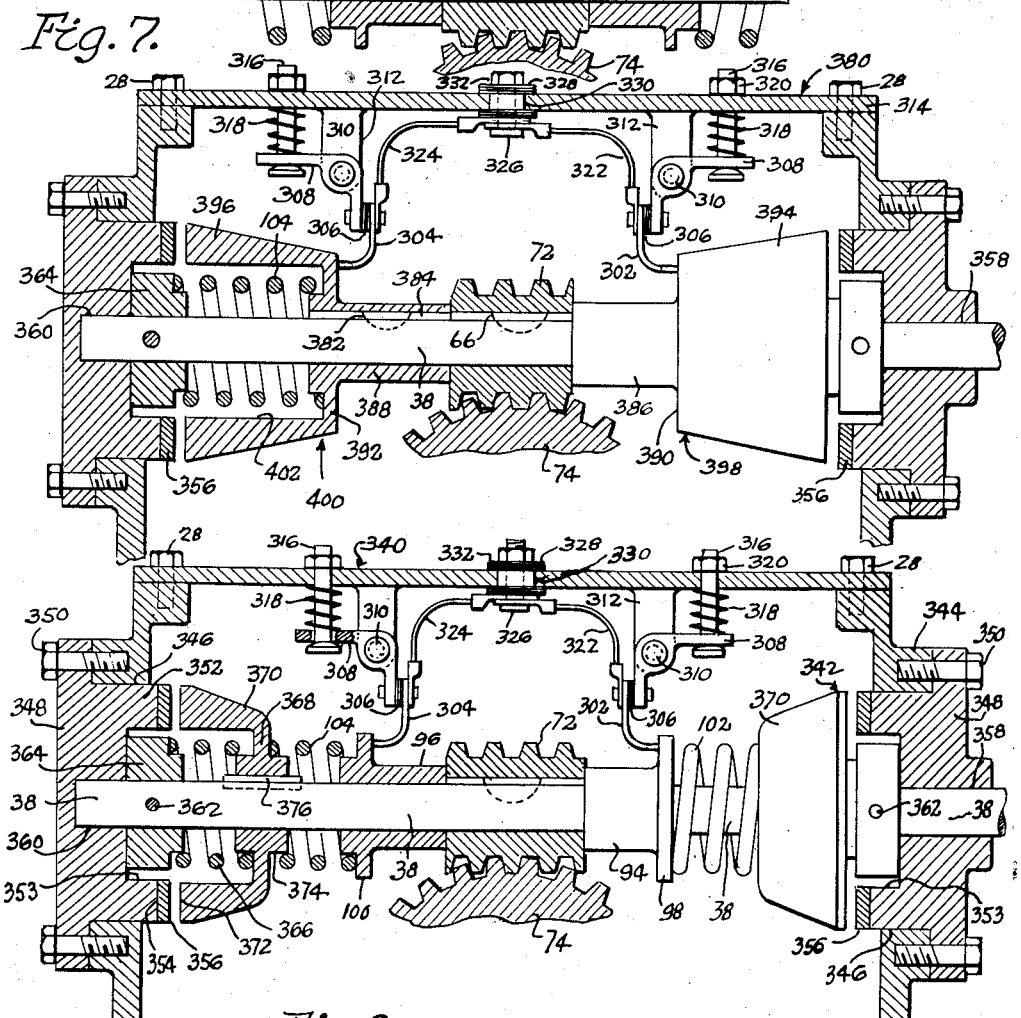
Fig. 5.
Fig. 7.
Fig. 6.
INVENTOR.
Glenn P. Gessell
BY
Barthel & Bugbee Attys July 19, 1960  G. P. GESSELL  2,945,925
LOAD-RESPONSIVE MOTOR SHUTOFF SYSTEM AND OPERATOR THEREFOR
Filed Jan. 21, 1958  4 Sheets-Sheet 4

United States Patent Office 2,945,925
Patented July 19, 1960

---

2,945,925

LOAD-RESPONSIVE MOTOR SHUTOFF SYSTEM AND OPERATOR THEREFOR

Glenn P. Gessell, 930 Lake Shore Road, Grosse Pointe Shores, Mich.

Filed Jan. 21, 1958, Ser. No. 710,222

9 Claims. (Cl. 200—47)

This invention relates to electric motor safety devices and, in particular, to overload-responsive motor shutoff systems and components thereof.

One object of this invention is to provide an overload-responsive shutoff system and operating device therefor which will automatically break the energization circuit of an electric motor by mainly mechanical means which are positively operative to shift a motor energization control switch immediately upon the development of an overload, without dependence upon thermal-responsive devices which might fail in an emergency, particularly after a long period of use.

Another object is to provide an overload-responsive motor shutoff system and operating device therefor of the foregoing character wherein the shutoff mechanism of the operating device includes a motive power input shaft carrying a longitudinally-shiftable worm meshing with a worm wheel on the motive power output shaft, together with resilient means which normally holds the worm in mesh with the worm wheel but permits the worm to shift longitudinally in response to the development of an overload retardation of the rotation of the output shaft, the shifting of the worm being effective to operate the motor energization control switch in the control circuit of the electric motor which drives the input shaft.

Another object is to provide an overload-responsive motor shutoff system and operating device therefor of the foregoing character wherein the shifting of the worm in one direction or the other and the consequent actuation of one of a pair of motor energization control switches energizes the relay which in turn deenergizes the electric motor energization circuit.

Another object is to provide an overload-responsive motor shutoff system and operating device therefor, as set forth in the object immediately preceding, wherein the relay also actuates an electro-magnetic circuit-isolation switch which prevents automatic restarting of the motor upon removal of the obstruction or other overload upon the output shaft.

Another object is to provide an overload-responsive motor shutoff system and operating device therefor, as set forth in the preceding objects, wherein the operating device is equipped with an automatically-operative brake which prevents reverse rotation of the motor by the load backward through the transmission gearing after the motor has been de-energized, thereby preventing the load from causing "running away" of the mechanism such as, for example, might occur by the breakage of a counterbalancing spring of a heavy industrial overhead door or by a heavily-loaded conveyor traversing a steep incline.

Another object is to provide an overload-responsive motor shutoff system and operating device therefor wherein the operating device normally maintains the control circuit normally closed and breaks the circuit upon the development of an overload.

Another object is to provide an overload-responsive motor shutoff system and operating device therefor, as set forth in the two objects immediately preceding, wherein the control circuit is adapted for use with three-button control, namely by forward, reverse and stop push buttons.

Other objects and advantages of the invention will become apparent during the course of the following description of the accompanying drawings, wherein:

Figure 1 is a central longitudinal section through an overload-responsive operating device for a motor shutoff system, according to one form of the invention, taken along the line 1—1 in Figure 2;

Figure 2 is a cross-section taken along the line 2—2 in Figure 1;

Figure 3 is a fragmentary vertical section taken along the line 3—3 in Figure 1, showing details of one of the overload-actuated switches;

Figure 4 is a wiring diagram of the overload-responsive motor shutoff system employing the overload-responsive operating device of Figures 1 and 2;

Figure 5 is a fragmentary central longitudinal section through a modification of the overload-responsive operating device of Figure 1, in the upper central portion thereof, wherein the circuit through the operating device is normally closed and is opened automatically upon the development of an overload;

Figure 6 is a fragmentary central longitudinal section through a further modified overload-responsive operating device, wherein the device of Figure 5 is additionally equipped with resiliently-mounted runaway-preventing brakes;

Figure 7 is a fragmentary central longitudinal section through a still further modified overload-responsive operating device, wherein the brake elements are integral with the operating collars

Figure 8:
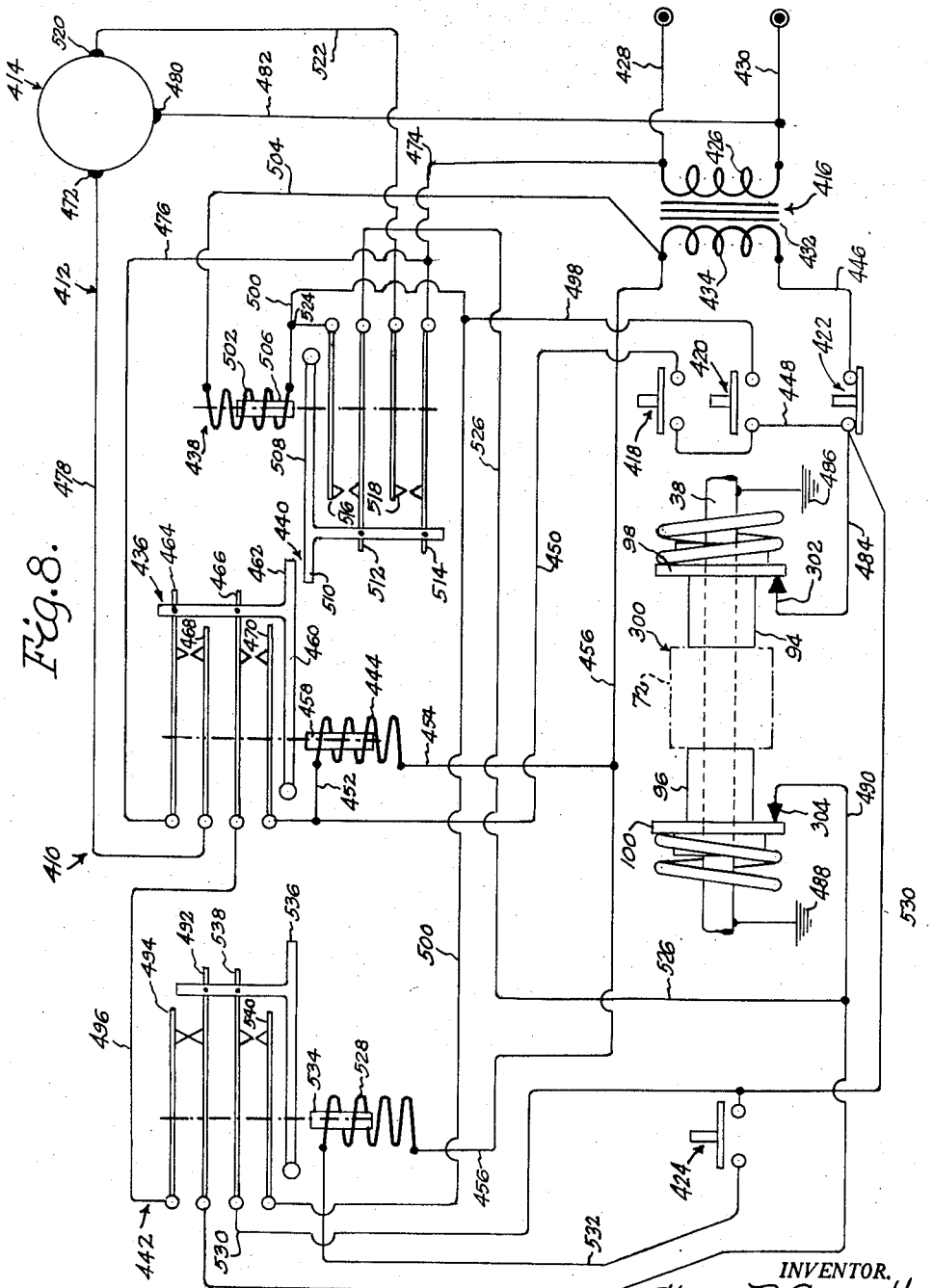
' and Figure 8 is a wiring diagram of the modified overload responsive motor shutoff system utilizing three-button control and employing the overload-responsive operating devices of Figures 5, 6 or 7.

In many installations of electric motors and mechanisms driven by them, in the event that an obstruction is encountered in the mechanism, the motor frequently keeps on running, so that overheating and consequent damage to the motor results. The present invention provides an overload-responsive motor shutoff system and operating device therefor which immediately de-energizes the motor energization circuit upon the development of an overload in the mechanism driven by the motor, the control device being of a mainly mechanical nature which positively operates one of a pair of control switches which in turn de-energize the motor energization circuit.

Referring to the drawing in detail, Figure 4 shows one form of overload-responsive motor shutoff system, generally designated 10, actuated by an overload-responsive operating device, generally designated 12, for de-energization of the control and energization circuit 13 of an electric motor, generally designated 14, supplied with electricity from power lines 16 and 18 respectively leading to an external source of electric current (not shown). In Figure 4, only the central portion of the operating device 12 is shown, and then only diagrammatically, the overload-responsive operating device 12 as a whole being shown in Figures 1 to 3 inclusive.

Referring now to Figures 1 and 2, the operating device 12 for the overload-responsive motor shutoff system 10 is enclosed in an oil-tight housing 20 having a base 22 adapted to be secured to a suitable support in the vicinity of the motor 14. The housing 20 is open at the top edge 24, where it is provided with a closure plate 26 secured thereto as by the bolts 28. Near its opposite ends, the closure plate 26 is provided with access openings 30 and 31 provided with threaded closure plugs 32, the removal of which enables the adjustment of the actuating points of the device 12, as explained more fully below.

The housing 20 is provided at one end 33' with a bearing boss 34 containing a bearing bore 36 which rotatably supports a power input shaft 38 to the outer end of which a pulley 40 is pinned or otherwise drivingly secured. The bearing bore 36 for purposes of simplicity is shown as formed directly in the boss 34 whereas in actual practice a replaceable bearing bushing is mounted in the boss 34 surrounding the shaft 38. The opposite end 42 of the housing 20 is provided with an opening 44 coaxial with the bearing bore 36 and receiving a cup-shaped antifraction bearing housing 46 bolted as at 48 to the end 42 and containing a stepped recess 50. Mounted in the stepped recess 50 is an anti-friction bearing unit or assembly 52, an end thrust ball bearing assembly being shown, the outer race of which is held in position by a retaining ring 54 bolted thereto as at 56 and the inner race of which is bored as at 58 to receive the reduced diameter threaded end portion 60 of the power input shaft 38. Threaded upon the reduced diameter threaded shaft portion 60 is an anti-friction bearing lock nut 62.

Intermediate its opposite ends and approximately in the middle thereof, the power input shaft 38 is provided with a key seat 64 carrying a conventional Woodruff key 66 which is slidably received in a keyway 68 formed longitudinally within the central bore 70 of a worm 72 slidably mounted on the shaft 38. The worm 72 is a straight worm and its teeth mesh with the teeth of a worm wheel 74, the hub of which is bored as at 76 to receive a power output shaft 78, the worm wheel 74 and shaft 78 being correspondingly grooved to receive a drive key 80. The output shaft 78 is rotatably mounted in aligned bearing bosses 82 and 84 (Figure 2) projecting inwardly from the opposite side walls 86 and 88 of the housing 20 and bored as at 90 and 92 respectively to rotatably support the output shaft 78. The output shaft 78 is mechanically connected to the mechanism driven by the motor 14, such as, for example, a garage door opening device, a conveyor drive or to any suitable motor-driven mechanism wherein an overload can develop.

The longitudinally-slidable worm 72 is engaged on its opposite ends by a pair of oppositely-facing thrust collars 94 and 96 freely and slidably mounted on the shaft 38 and provided with annular shoulders 98 and 100 forming abutments for a pair of opposed helical compression springs 102 and 104. The springs 102 and 104 encircle the power input shaft 38 on opposite sides of the worm 72 and their outer ends engage the annular shoulders or spring seats 106 and 108 respectively of a spring abutment collar 110 and a spring abutment nut 112. The spring abutment collar 110 is bored at 114 to slidably receive the input shaft 38, and is adjustably secured thereto in any suitable manner as by the set screw 116. The spring abutment nut 112, on the other hand, is provided with a threaded bore 118 threadedly engaging the threaded portion 120 of the power input shaft 38 immediately adjacent a stop shoulder 122 between the threaded portion 120 and the reduced diameter threaded portion 60 of the shaft 38. The threaded portion 120 of the input shaft 38 is drilled diametrically to receive a cotter pin 124 which passes through a selected pair of peripherally-spaced radial slots 126 formed in the end of the spring abutment nut 112 for locking the nut 112 in its adjusted position along the threaded shaft portion 120.

Depending from the closure plate 26 on the underside thereof are two longitudinally-spaced bracket portions 128 and 130 respectively. The bracket portion 128 is provided with upper and lower shaft bearing bores 132 and 134 respectively of large and small diameter, whereas the bracket portion 130 is similarly provided with upper and lower small and large diameter bearing bores 136 and 138 respectively. Journaled in the upper bores 132 and 136 are the opposite ends of an upper screw shaft 140, the reduced diameter portion 142 of which is journaled in the bearing bore 136 and has a peripherally-slotted or toothed adjustment wheel 144 pinned or otherwise drivingly secured thereto. The upper screw shaft 140 has a smooth right-hand end portion 146 and a threaded left-hand end portion 148.

Journaled in the lower bearing bores 134 and 138 are the opposite ends of a lower screw shaft 150 having a reduced diameter right-hand end 152 to which a toothed adjusting wheel 154 is pinned or otherwise drivingly secured. The right-hand end portion 156 of the lower screw shaft 150 is threaded, whereas the left-hand end portion 158 thereof is smooth. The upper and lower screw shafts 140 and 150 are parallel to the power input shaft 38 and their axes lie in a common plane with the axis of the shaft 38.

Movably mounted on the upper and lower screw shafts 140 and 150 are right-hand and left-hand switch carrier slide blocks 160 and 162 respectively (Figure 1), both being made of electrically-insulating material, which is also substantially immune to attack by the ingredients of the lubricating oil contained in the lower part of the housing 20. The block 160 has a smooth upper bore 164 slidably engaging the smooth right-hand end portion 146 of the upper screw shaft 140 and also has a parallel threaded lower bore 166 threadedly engaging the right-hand threaded portion 156 of the lower screw shaft 150. In a similar manner, the left-hand switch carrier block 162 is provided with an upper threaded bore 168 threadedly engaging the left-hand threaded end portion 148 of the upper screw shaft 140 and also having a smooth lower bore 170 slidably engaging the smooth left-hand end portion 158 of the lower screw shaft 150.

The right-hand and left-hand switch carrier blocks 160 and 162 are drilled transversely to receive retaining screws 172 and 174 passing through oppositely-facing approximately C-shaped switch contact fingers 176 and 178 respectively, the ends 180 and 182 of which extend downwardly into the path of travel of the shoulders 98 and 100 of the thrust collars 94 and 96 respectively. The screws 172 and 174 also secure terminals 184 and 186 to the switch contact fingers 176 and 178, and wires 188 and 190 run therefrom to terminals 192 and 194 through which passes the terminal bolt 196. The terminal bolt 196 passes upward through a flanged insulating bushing 198 in a hole 200 in the closure plate 26 (Figure 1) and is insulated therefrom by an insulating washer 202. Threaded upon the upper end portion of the terminal bolt 196 are upper and lower nuts 204 and 206, the lower of which serves to hold the bolt 196 and insulating members 198 and 202 in assembly while the upper nut 204 clamps thereto a terminal 208 from which a control wire 210 leads to the remainder of the circuit 10. The housing 20 is grounded as at 212 to any suitable conducting structure such as to a metal supporting framework (not shown).

Apart from the overload-responsive operating device 12 and the electric motor 14 (Figure 4), the control and energization circuit 13 of the overload-responsive motor shutoff system 10 includes a stepdown transformer 214, a normally-open motor starting push button switch 216 and a conventional latching relay 218. The stepdown transformer 214 has a primary winding 220 which is continuously energized to the lines 222 and 224 from the current supply lines 16 and 18 so long as the lines 16 and 18 themselves are energized. The transformer 214 has the usual iron core 226 and secondary winding 228, one end of which is grounded as at 230 by the line 232 to the same metallic or other conducting structure as the ground 212 of the housing 20.

From the opposite end of the transformer secondary winding 228, the line 234 runs to one end of the operating coil 236 of the latching relay 218, from the opposite end of which coil the line 238 runs to one pole of the normally open motor starting push button switch 216. From the opposite pole of the push button switch 216, the line 240 is grounded as at 242 to the same metallic or other conducting structure as the previously-mentioned grounds 212 and 230. The operating coil 236 of the latching relay 218 operates an armature 244 having a contact-operating link 246 for altering the energization of upper and lower relay contact sets 248 and 250 respectively.

The upper contact set 248 includes two fixed arms 252 and 254 between which is a movable intermediate arm 256. The upper and lower fixed arms 252 and 254 are provided with single contacts 258 and 260 respectively engageable with oppositely-facing movable contacts 262 and 264 of the upper and lower sides of the movable arm 256 alternately engageable with the fixed contacts 258 and 260. In a similar manner, the lower contact set 250 includes fixed upper and lower contact arms 266 and 268 between which is a movable intermediate arm 270. The fixed contact arms 266 and 268 are provided with single contacts 272 and 274, whereas the movable contact arm 270 is provided with oppositely-facing contacts 276 and 278 alternately engageable with the fixed contacts 272 and 274. The armature link 246 is connected to the upper and lower intermediate contact arms 256 and 270, and in the off position condition of the latching relay 218, the contacts of the upper and intermediate arms 252—256 and 266—270 are alternately closed and opened in response to the energization of the operating coil 236 to close the circuit between the intermediate arms 256 and 270 and the lower arms 254 and 268 respectively, as explained below in connection with the operation of the invention.

The latching relay, as its name suggests, is of a well-known type having a mechanical latching arrangement (not shown) operated by alternate energizations of the operating coil 236 and consequent alternate shifting of the armature 244 and armature link 246. Alternate energizations of the operating coil 236 first hold the contact 264 of the upper movable arm 256 in engagement with the contact 260 of the upper contact set 248 while holding the contact 278 of the lower movable arm 270 in engagement with the lower contact 274 of the lower contact set 250, ad next release the latching device to release these contacts so that they return to their original position shown in Figure 4. In other words, the first energization holds the contacts 264—260 and 278—274 in engagement, the next energization releases the latch and permits their disengagement, the third energization re-engages them, the fourth energization again permits their disengagement, and so forth indefinitely. The latching mechanism of the latching relay 218 is primarily mechanical rather than electrical, although operated by the shifting of the armature 244, and its details are beyond the scope of the present invention. They will be found disclosed in the Bergemann Patent No. 2,531,838 of November 28, 1950, for Latching Relay, and such latching relays of this patented construction are commonly available on the open market.

The current supply line 16 is connected directly to the lower contact arm 268 of the lower contact set 250, whereas the line 280 runs from the contact arm 270 of the lower contact set 250 to the motor 14, to the opposite pole of which is connected the current supply line 18. From the line 238, a branch line 282 runs to the lower contact arm 254 of the upper contact set 248, the line 210 being connected to the movable contact arm 256 thereof.

In the operation of the invention, let it be assumed that the power input shaft 38 of the overload-responsive operating device 12 is driven by any prime mover, preferably an electric motor belted or otherwise drivingly connected to the pulley 40 but optionally driven by any other suitable type of prime mover, such as a hydraulic or pneumatic motor, as desired, having an electrical control arrangement. Let it also be assumed that the power output shaft 78 is connected to the load to be moved, such as, for example, to a garage door operator or to a conveyor.

Let it also be assumed (Figure 1) that the springs 102 and 104 have been chosen of such force and compressed to the desired extent by screwing the spring abutment nut 112 to the right along the threaded portion 120 of the power input shaft 38 so that a predetermined force is applied to the collars 94 and 96 between which the longitudinally-slidable worm 72 floats. The force applied by the springs 102 and 104 thus determines the overload on the power output shaft 78 which must develop before the worm 72 can shift and set in motion the motor-stopping arrangement. When the desired adjustment has been reached, the cotter pin 124 is replaced in the nearest slot 126 in the nut 112 to lock it in its adjusted position. The rotary motion of the nut 112 thus forms a fine adjustment of the force of the springs 102 and 104 after a coarse adjustment has previously been made by moving the collar 110 and then securing it in its roughly adjusted position by the set screw 116.

Let it also be assumed that the points or ends 180 and 182 of the contact fingers 176 and 178 have been spaced at the desired distances from the annular shoulders 98 and 100 of the spring-urged thrust collars 94 and 96 respectively, so that the overload force at which the motor is to be halted is predetermined. The switch contact fingers 176 and 178 are adjusted individually by moving their respective slide blocks 160 and 162. This is done by removing the closure plugs 32 and inserting a screw driver or other suitable tool through the openings 30 and 31 to engage and rotate the toothed wheels 154 and 144 respectively and consequently to rotate the screw shafts 150 and 140 so as to propel the slide blocks 160 and 162 back and forth along the smooth portions 146 and 158 of their respective shafts 140 and 150 and correspondingly shift the switch contact fingers 176 and 178 respectively. The housing 20 is of course filled with lubricating oil to a depth sufficient to lubricate the worm wheel 74, worm 72 and bearings 34 and 52 of the power input shaft 38 (Figure 1) as well as the bearings 82 and 84 (Figure 2) of the power output shaft 78.

To start the load-moving mechanism in operation from the power output shaft 78, the operator depresses the motor starting push button switch 216, which also alternately serves as a motor-stopping push button switch. The closing of the switch 216 completes the energization circuit of the operating coil 236 of the latching relay 218 from the secondary winding 228 of the stepdown transformer 214 (the primary winding 220 of which, as previously stated, is continuously energized from the current supply lines 16 and 18) by way of the lines 234, 238, the now closed push button switch 216, the line 240, the ground connections 242 and 230 and the line 232, completing the circuit.

TThe first energization of the operating coil 236 of the latching relay 218 draws down the armature 244 and armature link 246 and with them the movable contact arms 256 and 270, engaging their contacts 264 and 278 with the fixed contacts 260 and 274 respectively, while at the same time the latching mechanism shown and described in the Bergemann Patent 2,531,838 of November 28, 1950, holds these contacts in engagement even though the operator immediately releases the push button siwtch 216 and thereby de-energizes the latching relay operating coil 236.

As a result, the motor 14 is energized directly from the current supply line 18 and indirectly from the current supply line 16 by way of the fixed lower switch arm 268 and contact 274 and movable contact 278 and movable switch arm 270 of the lower contact set 250 of the latching relay 218 and the line 280 from the movable contact arm 270 of the lower contact set 250 to the motor 14, completing the circuit. The motor 14 therefore starts running and rotates the power input shaft 38 and worm 72 slidably keyed thereto, thereby rotating the worm wheel 74 and the power output shaft 78 so as to operate the particular load driven thereby, such as the garage door operator, conveyor or the like.

If, now, an overload develops in the mechanism driven by the power output shaft 78 of the overload-responsive operating device 12, the shaft 78 and worm wheel 74 keyed thereto slow down and possibly stop, whereupon the continued rotation of the power input shaft 38 causes the worm 72 to thread its way along the toothed periphery of the worm wheel 74 axially relatively to the shaft 38 and pushing the thrust collar 94 or 96 along the shaft 38, compressing its respective spring 102 or 104 until the annular flange 98 or 100 engages its respective switch contact finger 176 or 178. This action closes the circuit between the ground connection 212 of the housing 20 and the line 210 through either the line 188 or 190 and the terminal bolt 196. The consequent closing of the circuit through the latched-together relay contact arms 256—254 and 270—268 re-energizes the operating coil 236 of the latching relay 218 momentarily through the above-described contact arms and the lines 210, 282, 238, 234 and 232 by way of the transformer secondary winding 228 to the respective grounds 230 and 212, completing the circuit.

The momentary energization of the operating coil 236 releases its latching mechanism described in the above-identified Bergemann Patent No. 2,531,838, thereby releasing the movable relay contact arms 270 and 256 to spring upward to the positions shown in Figure 4, and consequently de-energizing the motor energization circuit by breaking the circuit between the lines 16 and 280 at the now separated contacts 274 and 278. Customarily, the motor 14 is reversible or has associated with it an automatic reversal device whereby, upon the operator's again depressing the motor starting switch 216, the motor 14 will rotate in the reverse direction to tend to remove or expel the obstruction or other overload cause from the mechanism. This reversal arrangement is conventional and forms no part of the present invention, and therefore it is omitted in order to simplify the showing. In either case, the subsequent or second energization of the motor starting switch 216 in re-energizing the operating coil 236 of the latching relay 218 re-closes and latches the motor energization circuit in its closed position, as described above for the first depressing of the motor starting switch 216.

*Modified overload-responsive motor shutoff operating devices*

The modified overload-responsive motor shutoff operating device, generally designated 300, shown in Figure 5 is similar to the operating device 12 of Figures 1 and 2 except in the upper central portion thereof, hence the same reference numerals are employed for parts corresponding to those in Figures 1 and 2, particularly to the worm wheel 74, the worm 72, the shaft 38, springs 102 and 104 and collars 94 and 96. It will be observed, however, that in Figure 5 the device 300 provides switch contact fingers 302 and 304 which are normally in circuit-closing contact with the flanges 98 and 100 on the collars 94 and 96 respectively, the circuit being automatically broken upon the development of an overload. In this respect, therefore, the device 300 is the reverse of the device 12 of Figures 1 and 2 wherein the circuit is normally open and is closed automatically upon the development of an overload. For this purpose, the spring contact fingers 302 and 304 are bolted or otherwise secured through insulation 306 to bellcrank levers 308 supported on pivot pins 310 which in turn are mounted in lugs or ears 312 depending from the cover plate 314 of the housing 20 (not shown). The cover plate 314 and upper arms of the bellcranks 308 are bored to receive adjusting bolts 316, the heads of which engage the upper arms of the bellcrank levers 308, compression springs 318 being mounted on the bolts 316 to urge the upper arms of the bellcrank levers 308 downward against the heads of the bolts 316, the threaded upper ends of which carry adjusting nuts 320.

Also bolted or otherwise secured to the bellcrank levers 308 through the same insulation 306 and electrically connected to the spring contact fingers 302 and 304 are the lower terminals of flexible conductors 322 and 324 (Figure 5), the upper terminals of which are connected to a common terminal bolt 326 which passes upward through a flanged insulating bushing 328 mounted in a hole 330 in the cover plate 314 and terminating in a terminal nut 332 through which electrical connection is made to the remainder of the circuit in a manner similar to that discussed above in connection with the operating device 12 of Figures 1 and 2.

The further modified overload-responsive motor shutoff operating device, generally designated 340, shown in Figure 6 includes all of the mechanism of the device 300 of Figure 5 and adds to it automatically-operating braking devices, generally designated 342. Consequently, the elements in the central portion of Figure 6 are designated with the same reference numerals as those of Figure 5 and only the construction of the braking devices 342 requires description. For this purpose, the housing 344 at its opposite ends is provided with aligned bores 346 coaxial with the shaft 38 and adapted to receive a recessed bearing and brake lining supporting plate 348 bolted thereto as at 350 and having a reduced diameter portion 352 extending through and fitting each bore 346 and containing a central recess 353.

Mounted on the annular end face 354 of each reduced diameter portion 352 is an annular brake lining member or disc 356 of suitable conventional brake lining material, such as one of the asbestos brake lining materials available on the open market and well known to mechanical engineers. The right-hand and left-hand plates 348 are provided with aligned shaft bores 358 and 360 respectively, the former extending entirely through the plate 348 for through passage of the shaft 38, whereas the latter extends only partway through its respective plate 348 to rotatably support the end of the shaft 38 without through passage thereof. For purposes of simplification, the bearings provided by the bearing bores 358 and 360 are illustrated as plain bearing bores, whereas in actual construction, anti-friction bearings would be employed similar to the anti-friction bearing unit or assembly 52 in Figure 1.

Pinned or otherwise drivingly secured as at 362 to the shaft 38 within the central recesses 352 in the discs 348 is a spring abutment collar 364 which is engaged by one end of a helical brake-releasing compression spring 366, the opposite end of which engages the radial end wall 368 of a bell-shaped brake shoe 370, the annular end face 372 of which can be pushed into braking engagement with the brake disc 356. The bell-shaped brake shoes 370 face in opposite directions toward their respective brake discs 356, and have central hubs 374 which are grooved to slidably engage elongated driving keys 376 seated in the correspondingly-grooved adjacent portions of the shaft 38.

The still further modified overload-responsive motor shutoff operating device, generally designated 380, shown in Figure 7 is very similar in the construction and arrangement of its central mechanism to that of Figures 5 and 6 but differs at the right and left-hand ends. The shaft 38 adjacent the opposite ends of the worm 72 is recessed to receive a key 382 which slidably and drivingly engages an elongated groove 384 in the collar 386 or 388 so that the collars 386 and 388 are slidable along the shaft 38 while retaining a driving connection therewith instead of being slidable and rotatable thereon as in the case of the oppositely-facing thrust collars 94 and 96 of Figure 1. The collars 386 and 388 are provided respectively with radial flanges 390 and 392 normally engaged by the ends of the switch contact fingers 302 and 304 respectively. Integral with and extending in opposite directions from the flanges 390 and 392 toward the brake discs 356 on the end plates 348 are annular brake members or shoes 394 and 396, the whole forming a pair of hollow bell-shaped combined braking and switch contact members 398 and 400 respectively.

The members 398 and 400 have end recesses 402 therein receiving the compression springs 102 and 104 (the compression spring 102 being concealed within the brake member 394), the opposite end of each spring 102 or 104 engaging an abutment collar 364 identical with the construction shown at the opposite ends of Figure 6 and provided with similar bearing bores 358 and 360 for the opposite ends of the shaft 38. As in the case of the operating device 340 of Figure 6, in actual construction the plain bearings 358 and 360 would be replaced by anti-friction bearing assemblies similar to the anti-friction bearing assembly 52 at the left-hand end of the shaft 38 in Figure 1.

Three-button overload-responsive shutoff system for normally-closed operating devices The three-button overload-responsive motor shutoff system, generally designated 410, shown in Figure 8 includes an operating or control and energization circuit, generally designated 412, connected to any one of the normally-closed operating devices 300, 340 or 380 of Figures 5, 6 or 7 respectively, the operating device 300 of Figure 5 being selected for purposes of illustration. Apart from the overload-responsive operating device 300, and a reversible electric motor 414 corresponding to the electric motor 14 of Figure 4 drivingly connected to the shaft 38 through the pulley 40, the control and energization circuit 412 of the modified overload-responsive motor shutoff system 410 includes a step-down transformer 416, normally open motor forward and reverse starting switches 418 and 420, a normally-closed stop switch 422 and a normally-open safety switch 424. The step-down transformer 416 has a high voltage primary winding 426 which is continuously energized from the power current supply lines 428 and 430 so long as the latter are themselves energized. The step-down transformer 416 has the usual iron core 432 and low voltage secondary winding 434 which provides control current at any suitable low voltage, 24 volts being the commonly-used voltage for control current in such circuits.

In addition to the above-mentioned components, the circuit 412 also contains interlocked forward and reverse relays, generally designated 436 and 438 respectively, provided with a mechanical interlocking arrangement 440 preventing actuation of one of the relays 436 or 438 until the other one has been reactivated. The circuit 412 also contains a safety relay, generally designated 442. The individual parts of the various components of the circuit 412 are described below in connection with their wiring, as set forth below in the description of the operation of the circuit.

In the operation of the circuit 412 for forward running, such as to energize the motor 414 in a forward direction to open a door, drive a conveyor in a forward direction or the like, let it be assumed that the power output shaft (not shown) operatively connected to the worm gear 74 of Figures 5, 6 and 7, similar to the power output shaft 78 of Figure 1, is connected to the load to be moved.

To start the load-moving mechanism in forward operation from the power output shaft 78, the operator depresses the normally-open forward push button switch 418, thereby energizing the operating coil 444 of the forward relay 436 by way of the line 446 connecting to one terminal of the constantly-energized secondary winding 434 of the step-down transformer 416, the normally closed stop push button switch 422, the line 448 interconnecting the left end contact of the push button switches 418, 420 and 422, the now closed switch blade of the forward push button switch 418, the lines 450 and 452, the forward relay operating coil 444, and the lines 454 and 456 connected to the opposite terminal of the secondary winding 434 of the step-down transformer 416, completing the circuit. The energization of the forward relay operating coil 444 pulls down its movable core 458 and with it the forward relay armature 460, the lockout projection 462 of which temporarily prevents actuation of the reverse relay 438.

The downward shifting of the forward relay armature 460 closes both sets of normally-open contacts of its upper and lower movable switch blades 464 and 466 upon the corresponding contacts of the fixed switch blades 468 and 470 thereof. The closing of the contacts of the upper switch blades 464 and 468 energizes the forward running terminal 472 of the motor 414 from the high voltage power current supply line 428 by way of the lines 474 and 476, the upper movable switch blade 464, the upper fixed switch blade 468 upon which it is now closed, the line 478, the forward motor terminal 472, the forward winding of the motor 414, the common motor energization terminal 480 of the motor 414, and the line 482 running back to the power current supply line 430, completing the circuit, and starting the motor 414 running in a forward load-moving direction, rotating the shaft 38 in such a direction.

Even though the operator immediately releases the forward motor starting switch button 418, the closing of the forward relay 436 just described has meanwhile established a holding circuit for its operating coil 444 which maintains the energization of the latter notwithstanding the opening of the circuit through the release of the forward push-button switch 418, this holding circuit being established through the thereby-closed lower movable and fixed switch blades 466 and 470. The holding energization circuit is thus closed from the lower terminal of the constantly-energized secondary step-down transformer winding 434 by way of the normally-closed stop switch 446, the line 484, the normally closed switch contact finger 302 of the operating device 300, the flange 98, the collar 94, the ground connection 486, as to the housing of the operating device 300, the ground connection 488, the collar 96, the flange 100, the normally-closed switch contact finger 304, the line 490, the upper movable and fixed switch blades 492 and 494 of the safety relay 442 through their normally-closed contacts, the line 496, the lower movable and fixed switch blades 466 and 470 of the forward relay 436 through their now closed contacts, the line 452, the forward relay operating coil 444, and the lines 454 and 456 back to the upper terminal of the secondary winding 434 of the step-down transformer 416, completing the circuit. The forward relay 436 will thus remain closed through the holding circuit established by the closing of the movable and fixed lower switch blades 466 and 470 until either the normally-closed stop push button switch 422 is depressed or the shifting of the worm 72 axially along the shaft 38 in response to the development of an overload in the manner described in connection with the operation of the operating device 12 of Figure 1, shifts either the collar 94 or the collar 96 axially along the shaft 38 to open the circuit between the flange 98 or 100 and its respective switch contact finger 302 or 304, thereby opening the circuit between the lines 484 and 490 and consequently de-energizing the operating coil 444 of the forward relay 436. This action permits the forward relay armature 460 to return to its normally-open position of Figure 8, separating the contacts of the upper movable and fixed switch blades 464 and 468 and thus opening the circuit between the lines 476 and 478 leading to the forward terminal 472 of the motor 414, halting the motor 414.

To start the load-moving mechanism in reverse operation, the operator closes the reverse push button switch 420, thereby causing current to flow from the lower terminal of the secondary winding 434 of the step-down transformer 416 by way of the line 446, the normally-closed stop push button switch 422, the line 448, the now closed reverse push button switch 420, the lines 498 and 500, the operating coil 502 of the reverse relay 438 and the line 504 leading back to the upper terminal of the secondary winding 434 of the step-down transformer 416, completing the circuit.

The consequent energization of the reverse relay operating coil 502 pulls up the core 506 and armature 508 of the reverse relay 438, causing its lockout projection 510 to lock out and prevent shifting of the forward relay armature 460 while at the same time the shifting of the reverse relay armature 508 closes the contacts of the upper and lower movable switch blades 512 and 514 upon the contacts of their respective fixed switch blades 516 and 518. The closing of the circuit between the lower switch blades 514 and 518 energizes the reverse windings of the motor 414 through the line 482 leading from the power current supply line 430 to the common terminal 480 of the motor 414, thence from the reverse terminal 520 thereof by way of the line 522, the now-closed lower switch blades 518 and 514, and their respective contacts and the line 474 back to the power current supply line 428, completing the circuit.

The operator immediately releases the reverse push button switch 420 to its normally-open position, but meanwhile the reverse energization of the motor 414 is continued by a holding circuit established through the now-closed upper switch blades 512 and 516 and their respective contacts from the upper terminal of the secondary winding 434 of the step-down transformer 416 by way of the line 504, the reverse relay operating coil 502, the line 524, the now closed upper movable and fixed switch blades 516 and 512 and their respective contacts, the line 526, the line 490, the contact finger 304 of the operating device 300, the collar 96, the ground connection 488, the ground connection 486, the collar 94, the contact finger 302, the line 484, the normally-closed stop push button switch 422 and the line 446 back to the lower terminal of the secondary winding 434 of the step-down transformer 416, completing the circuit.

Thus, the motor 414 will start and run in a reverse direction until either the stop push button switch 422 is depressed by the operator, or the overload operation of the operating device 300 opens the normally-closed circuit at either of the contact fingers 302 or 304 by the action of the worm 72 being moved along its shaft 38 by the worm gear 74 in response to an overload development in the mechanism connected to the worm gear 74. The consequent opening of the above-described energization circuit for the reverse relay operating coil 502 permits the upper and lower movable switch blades 512 and 514 to drop to their normally open positions, de-energizing the motor 414 and halting the load-moving mechanism driven thereby.

The safety-switch-operated actuation of the circuit 412 of the system 410 occurs when the normally-open safety switch 424 is closed, usually by the operation of a pressure-responsive or temperature-responsive device, such as a pressure-fluid cylinder and piston or thermostat respectively. Assuming, for example, that the forward push button switch 418 has been operated and the forward relay 436 is energized through the energization of its operating coil 444 in the manner described above, so that the motor 414 is running in a forward direction, the closing of the normally-open safety switch 424 energizes the operating coil 528 from the lower terminal of the secondary winding 434 of the step-down transformer 416 by way of the line 446, the normally-closed stop push button switch 422, the line 530, the now-closed safety switch 424, the line 532, the safety relay operating coil 528 and the line 456 back to the upper terminal of the secondary winding 434 of the step-down transformer 416, completing the circuit.

The consequent downward shifting of the core 534 and armature 536 opens the normally-closed contacts and circuit between the upper switch blades 494 and 492 of the safety relay 442 and closes the normally-open contacts and circuit between the lower movable and fixed switch blades 538 and 540 of the safety relay 442. The opening of the normally-closed contacts and upper switch blades 494 and 492 opens the above-described holding circuit for the forward relay operating coil 444 established by the closing of its lower switch blades 466 and 470, thereby de-energizing the forward relay 436 and permitting its movable switch blades 464 and 466 to move upward to their normally open positions, thereby de-energizing the energization circuit through the line 478 to the forward energization terminal 472 of the motor 414, halting the motor.

The same closing of the safety switch 424 simultaneously energizes the operating coil 502 of the reverse relay 438 to close the circuit in the reverse energization line 422 of the motor 414 through the closing of the normally-open contacts and lower switch blades 538 and 540 of the safety relay 442 brought about by the energization of the operating coil 528 thereof. As a result, current flows from the lower terminal of the secondary winding 434 of the step-down transformer 416 by way of the line 446, the normally-closed stop switch 422, the line 530, the now closed contacts of the lower switch blades 538 and 540 of the safety relay 442, the line 500, the reverse relay operating coil 502 and the line 504 back to the upper terminal of the secondary winding 434 of the step-down transformer 416, completing the circuit and causing the reverse relay armature 508 to close the normally open contacts of the switch blades 512, 514, 516 and 518. This in turn causes the motor 414 to be reversely energized by the energization of the line 522 to its reverse terminal 520 through the now closed contacts of the lower switch blades 514 and 518 and the line 474 to the power current supply line 428, completing the circuit through the line 482 running from the power current supply line 430 to the common energization terminal 480 of the motor 414. As a consequence, the motor 414, after halting, runs in a reverse direction so as to move the load reversely out of danger.

The same action of energizing the reverse relay operating coil 502 completes the holding circuit thereof in the manner previously described to cause the motor 414 to continue running in a reverse direction until halted by a limit switch (not shown) or overload development in the manner described above.

Due to the mechanical lockout arrangement 440 of the forward and reverse relays 436, only the contacts of one of these relays can be energized even though both operating coils 444 and 502 are energized at the same time. In other words, one of the relay armatures 460 or 508 has to return to its normal position before the other armature can shift to its operative position, due to the interengagement of the projections 462 and 510 of the armatures 460 and 508.

If, for example, the insulation would permit a condition to develop which would cause runaway of the motor 414, even though it were de-energized by the safety switch 424 or overload-responsive operating device 300, the brake-equipped operating device 340 of Figure 6 or 380 of Figure 7 is substituted for the operating device 300 of Figure 5. In that event, such as where the counterbalancing spring of a heavy commercial garage door has broken and the door in descending under the force of gravity rotates the armature of the motor 414 backward even though it has been de-energized, damage to the parts and injury to nearby persons is prevented by the action of the braking mechanism associated with the operating devices 340 and 380. In the case of a single-thread worm 72, the motion is irreversible so that the worm gear 74 cannot drive the worm 72. In the case of a multiple-thread worm used in heavy duty installations in place of the single-thread worm 72, the multi-thread worm is not irreversible but can be driven reversely by the worm gear 74 in the same manner as a helical gear will drive a helical pinion.

If the installation is equipped with the operating device 340 of Figure 6, the consequent shifting of the multi-thread worm 72 by being reversely driven from the worm gear 74 by the descent of the door after breakage of the counterbalancing spring or by other runaway action of the load, correspondingly shifts the collar 94 or 96 to compress the spring 102 or 104 so as to force the corresponding brake member 370 into braking engagement with the respective brake disc 354 and halt the motion of the load. While this action is occurring, the internal compression spring 366 is compressed by the outward travel of the brake member 370 as its annular braking surface 372 moves into engagement with the brake lining 356. On the other hand, if the brake-equipped operating device 380 is substituted for the operating device 300 in the particular installation, the same shifting of the multi-thread worm 72 directly shifts the brake member 394 or 396 through its direct connection to the collar 386 or 388, without the intermediate action of the spring 102 or 104.

It will be observed that while the invention has been described in connection with the prevention of damage resulting from an overload arising during the operation of the mechanism to which it is connected, the development of an underload in the mechanism would also cause the invention to be actuated. Such an underload might develop, for example, in a heavily loaded belt conveyor going down a hill, mountain or other steep incline. In such instances, the safety circuit is actuated by the motion of the reciprocating worm along its shaft in the opposite direction from the direction in which it moves in response to an overload.

What I claim is:

1. An overload-responsive circuit-operating device for interposition between an electrically-controlled driving motor and a driven apparatus, said device comprising a supporting structure, rotary power input and output shafts journaled in said structure and adapted to be drivingly connected to the driving motor and driven apparatus, respectively, means for holding said input shaft against axial motion during rotation thereof, driving mechanism movable axially of said input shaft and including a substantially straight worm axially slidably mounted on said input shaft with a sliding driving connection therebetween and resiliently-urged means including a thrust element slidably mounted on said input shaft in engagement with said worm and a spring yieldingly engaging said thrust element in axial-motion-resisting relationship therewith; a worm gear drivingly connected to said output shaft and disposed in meshing engagement with said worm, and electric switch means disposed in the path of travel of said driving mechanism and actuated thereby upon axial travel of said worm along said input shaft relatively to said worm gear in response to the imposition of an overload on said output shaft, said switch means including a switch mount adjustably mounted on said supporting structure, said switch means also including a pair of engageable and disengageable switch contacts, one of said switch contacts being mounted on and movable with said thrust element, the other of said switch contacts being mounted on and adjustably movable with said switch mount.

2. An overload-responsive circuit-operating device, according to claim 1, wherein the resiliently-urged means includes a pair of spring-urged thrust elements engaging opposite ends of said worm and wherein said switch means includes two switch mounts adjustably mounted in spaced relationship on said supporting structure and wherein said switch means also includes two pairs of mutually engageable and disengageable switch contacts, one switch contact of each pair being mounted on and movable with one of said thrust elements, the other switch contact of each pair being mounted on and adjustably movable with one of said switch mounts, said pairs of switch contacts being separately operatively engageable by said thrust elements upon axial travel of said worm in opposite directions along said input shaft.

3. An overload-responsive circuit-operating device, according to claim 2, wherein means is provided for adjustably moving the switch mounts independently of one another.

4. An overload-responsive circuit-operating device, according to claim 1, wherein said switch mount includes a lever pivotally mounted on said supporting structure, said other switch contact being mounted on and movable with said lever and an adjusting member movably engaging said lever.

5. An overload-responsive circuit-operating device, according to claim 4, wherein the adjusting member includes an adjusting screw threadedly held by said supporting structure.

6. An overload-responsive circuit-operating device for interposition between an electrically-controlled driving motor and a driven apparatus, said device comprising a supporting structure, a rotary power output shaft journaled in said structure and adapted to be drivingly connected to the driven apparatus, worm driving mechanism including a power input shaft member journaled in said supporting structure and a substantially straight worm member mounted on and drivingly connected to said input shaft member, said worm member being mounted for axial sliding motion relatively to said supporting structure, resiliently-urged means yieldingly engaging said worm member in axial-motion-resisting relationship therewith, a worm gear drivingly connected to said output shaft and disposed in meshing engagement with said worm, electric switch means disposed in the path of travel of said worm-driving mechanism and actuated thereby upon axial travel of said worm member relatively to said supporting structure and worm gear in response to the imposition of an overload on said output shaft, a movable braked element shiftably connected to said worm-driving mechanism, and a braking element connected to said supporting structure and receiving braking engagement from said brake element in response to the overload-produced axial motion of said worm member.

7. An overload-responsive circuit-operating device, according to claim 6, wherein said resiliently-urged means includes a thrust element on said input shaft member engageable with said worm member and a spring yieldingly engaging said thrust element, said braked element being connected to and movable with said thrust element.

8. An overload-responsive circuit-operating device, according to claim 6, wherein said resiliently-urged means includes a thrust element on said input shaft member engageable with said worm member, a spring yieldingly engaging said thrust element, and a movable spring abutment element engaging said spring in spaced relationship with said thrust element, said braked element being connected to and movable with said abutment element.

9. An overload-responsive circuit-operating device, according to claim 8, wherein a resilient member is mounted on said structure in yielding engagement with said abutment element.

References Cited in the file of this patent
UNITED STATES PATENTS

| | | |
|---|---|---|
| 1,479,178 | Harvey | Jan. 1, 1924 |
| 1,551,512 | Goff | Aug. 25, 1925 |
| 2,203,233 | Panish | June 4, 1940 |
| 2,276,740 | Saito | Mar. 17, 1942 |
| 2,317,490 | Simpson | Apr. 27, 1943 |
| 2,484,616 | Dulaney | Oct. 11, 1949 |
| 2,548,809 | Norman | Apr. 10, 1951 |
| 2,566,824 | Carlson | Sept. 4, 1951 |
| 2,683,848 | Schmitter | July 13, 1954 |
| 2,796,482 | Inderau | June 18, 1957 |